US008738938B2

(12) United States Patent
Yokomizo (10) Patent No.: US 8,738,938 B2
(45) Date of Patent: May 27, 2014

(54) INFORMATION PROCESSING APPARATUS, METHOD FOR CONTROLLING THE SAME, AND STORAGE MEDIUM

(75) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 12/871,160

(22) Filed: Aug. 30, 2010

(65) Prior Publication Data

US 2011/0078464 A1    Mar. 31, 2011

(30) Foreign Application Priority Data

Sep. 25, 2009    (JP) ................. 2009-221338

(51) Int. Cl.
*G06F 1/26* (2006.01)
*G06F 1/32* (2006.01)

(52) U.S. Cl.
USPC ............................ 713/300; 713/320; 713/324

(58) Field of Classification Search
USPC ........................ 713/300, 320, 323, 324, 340
See application file for complete search history.

(56) References Cited

U.S. PATENT DOCUMENTS

| | | | |
|---|---|---|---|
| 7,020,403 B2 * | 3/2006 | Nomura ............................ 399/8 |
| 7,076,673 B2 * | 7/2006 | Yoshikawa .................... 713/300 |
| 8,001,404 B2 * | 8/2011 | Pathak .......................... 713/320 |
| 2002/0140963 A1 * | 10/2002 | Otsuka ......................... 358/1.14 |
| 2004/0125399 A1 * | 7/2004 | Kobayashi .................... 358/1.14 |
| 2005/0007628 A1 * | 1/2005 | Yamano et al. .............. 358/1.15 |
| 2006/0010331 A1 * | 1/2006 | Ohara ............................ 713/323 |
| 2006/0075269 A1 * | 4/2006 | Liong et al. .................. 713/300 |
| 2009/0164816 A1 * | 6/2009 | Yasuda .......................... 713/320 |
| 2010/0218011 A1 * | 8/2010 | Diab et al. .................... 713/310 |
| 2010/0235619 A1 * | 9/2010 | Inoue ............................. 713/151 |

FOREIGN PATENT DOCUMENTS

| | | |
|---|---|---|
| CN | 1226017 A | 8/1999 |
| CN | 101515925 A | 8/2009 |
| CN | 101598968 A | 12/2009 |
| JP | 2000-165419 A | 6/2000 |
| JP | 2001-239728 A | 9/2001 |
| JP | 2009-049699 A | 3/2009 |
| JP | 2009-151537 A | 7/2009 |
| KR | 10-2006-0012287 A | 2/2006 |

* cited by examiner

*Primary Examiner* — Khanh Dang (74) *Attorney, Agent, or Firm* — Canon USA, Inc., IP Division (57) ABSTRACT

An information processing apparatus includes an input unit configured to input data, and a control unit configured to control a power mode of the information processing apparatus. When the input unit inputs data while the information processing apparatus is operated in the second power mode and when the data input by the input unit is data to be immediately processed by the first processing unit, the power mode of the information processing apparatus is shifted from the second power mode to the first power mode. When the data input by the input unit is data not to be immediately processed by the first processing unit, the power mode of the information processing apparatus remains in the second power mode.

7 Claims, 11 Drawing Sheets

| sort | length | name | pattern |
|---|---|---|---|
| IP | 1 | version | 4 |
|  | 1 | service field | 0 |
|  | 2 | total length | Don't care |
|  | 2 | identification | Don't care |
|  | 1 | flags | 0 |
|  | 1 | offset | 0 |
|  | 1 | ttl | Don't care |
|  | 1 | protocol | UDP |
|  | 2 | checksum | Don't care |
|  | 4 | source addr | Don't care |
|  | 4 | dst addr | own IPv4 addr |
| UDP | 2 | source port | Don't care |
|  | 2 | dst port | 161 |
|  | 2 | length | Don't care |
|  | 2 | checksum | Don't care |
| SNMP | 1 | version | Don't care |
|  | 6 | community | public |
|  | 4 | data | get request |
|  | 1 | request ID | 92 |
|  | 1 | error status | 0 |
|  | 1 | error index | 0 |
|  | 11 | name | mib-2.25.3.2.1.5.1 |

FIG.5

| sort | length | name | pattern |
|---|---|---|---|
| IP | 1 | version | 4 |
| | 1 | service field | 0 |
| | 2 | total length | calculate |
| | 2 | identification | calculate |
| | 1 | flags | 0 |
| | 1 | offset | 0 |
| | 1 | ttl | 128 |
| | 1 | protocol | UDP |
| | 2 | checksum | calculate |
| | 4 | source addr | own IPv4 addr |
| | 4 | dst addr | calculate |
| UDP | 2 | source port | 161 |
| | 2 | dst port | calculate |
| | 2 | length | calculate |
| | 2 | checksum | calculate |
| SNMP | 1 | version | calculate |
| | 6 | community | public |
| | 4 | data | get response |
| | 1 | request ID | 92 |
| | 1 | error status | 0 |
| | 1 | error index | 0 |
| | 11 | name | mib-2.25.3.2.1.5.1 |
| | 1 | value | 2 |

| ITEM | LENGTH | |
|---|---|---|
| EtherFrame | | |
| DESTINATION ETHER ADDRESS | 6 | |
| SOURCE ETHER ADDRESS | 6 | |
| FRAME TYPE | 2 | |
| IPFrame | | |
| VERSION + DATA LENGTH | 1 | |
| TOS | 1 | |
| DATA LENGTH | 2 | |
| ID | 2 | |
| FLAG | 2 | 1001 |
| TTL | 1 | |
| PROTOCOL ID | 1 | |
| CHECKSUM | 2 | |
| SOURCE IP ADDRESS | 4 | |
| DESTINATION IP ADDRESS | 4 | |
| UDP Frame | | |
| SOURCE PORT NUMBER | 2 | |
| DESTINATION PORT NUMBER | 2 | |
| UDP DATA LENGTH | 2 | |
| UDP CHECKSUM | 2 | |
| SNMP Frame | | |
| TAG + LENGTH | 2 | |
| VERSION | 3 | |
| COMMUNITY NAME (1003) | 8 | |
| UDP Type | 2 | 1002 |
| Request ID | 3 | |
| Error Status (1006) | 3 | |
| Error index | 3 | |
| DATA LENGTH | 2 | |
| OID (1004) | ANY | |
| VALUE (1005) | ANY | |

ID
INFORMATION PROCESSING APPARATUS, METHOD FOR CONTROLLING THE SAME, AND STORAGE MEDIUM

BACKGROUND OF THE INVENTION

1. Field of the Invention

The present invention relates to a communication control device that transmits a job received from a network to an information processing apparatus.

2. Description of the Related Art

Recently, a trend toward power saving has come to increased and various types of information processing apparatuses have a power saving mode in which part of functions of the apparatus are stopped in order to reduce an electric power consumption, in addition to a normal mode in which a user can use all the functions of the apparatus without feeling a stress. The information processing apparatus that has the above described power saving mode includes a so-called network controller that controls communication with the other apparatus connected to the network. A power supply to a side of the network controller is always working, whereas a power supply to the other apparatus is controlled so as to be shifted from the normal power mode to the power saving mode.

In the information processing apparatus, in order to shift a state of the apparatus from the normal mode to the power saving mode, the apparatus is controlled so that the mode is shifted from the normal mode to the power saving mode, for example, in a case where the user presses a power saving switch or in a case where the apparatus fails to receive a network packet for a predetermined time period from an external network host.

On the other hand, in returning the apparatus from the power saving mode to the normal mode, the apparatus is controlled so that the apparatus is returned from the power saving mode, for example, in a case where the user clicks the power saving switch or the apparatus receives a WakeUP packet from the external network host.

For example, in a network system discussed in Japanese Patent Laid-open No. 2000-165419, in a case where the apparatus receives a packet from an external network device during the power saving mode, a proxy response server transmits a response, i.e., a predetermined type of packet, when the packet received from the external network device matches one of message patterns registered by the proxy response server. In other words, the information processing apparatus can keep the power saving mode during this time.

On the other hand, in a case where the packet received from the external network device does not match any one of the registered message patterns, a main body is activated. However, in a case where the packet received from the external network device matches one of the registered message patterns, a response is made by a Network I/F without activating the main body. Therefore, a power status of the apparatus during the power saving mode is kept.

In the above described information processing apparatus, there are two types of packets which are to be woken up on LAN (i.e., WOL) by the network controller. One of the packets is a packet to be woken up on LAN at the time the packet is received and the other one of the packets is a packet that may be processed when the apparatus is returned according to the other factor without waking up the apparatus on LAN at the time the packet is received.

However, a network device system described in Japanese Patent Laid-open No. 2000-165419 has such a configuration that a WOL function is always executed regardless of a memory capacity or the like. More specifically, the received packet to which a proxy response is not possible is always notified to the main body.

Accordingly, in the power saving mode, since the information processing apparatus in its entirety is woken up on LAN according to proxy response processing at the side of the network controller, there was a case where a satisfactory power saving effect is not achieved.

SUMMARY OF THE INVENTION

The present invention is directed to a communication control device and a job processing method of the communication control device capable of keeping a state of power saving mode while the job is stored, without returning the communication control device from the power saving mode even when a job to be processed is received by the information processing apparatus.

According to an aspect of the present invention, an information processing apparatus including a first processing unit and a second processing unit and configured to operate in a first power mode in which electric power is supplied to the first processing unit or in a second power mode in which electric power is not supplied to the first processing unit but is supplied to the second processing unit; the information processing apparatus includes an input unit configured to input data, and a control unit configured to control a power mode of the information processing apparatus. When the input unit inputs data while the information processing apparatus is operated in the second power mode and when the data input by the input unit is data to be immediately processed by the first processing unit, the power mode of the information processing apparatus is shifted from the second power mode to the first power mode. When the data input by the input unit is data not to be immediately processed by the first processing unit, the power mode of the information processing apparatus remains in the second power mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In the following description, the image forming apparatus can be operated in any one of a plurality of following power modes. In a first power mode (i.e., a normal power mode), electric power is supplied to a main body 100 and a Network Interface Card (NIC) 120. In a second power mode (i.e., a power saving mode/a sleep mode), electric power is not supplied to the main body 100 but is supplied to the NIC 120.

In the following description, an example of a state that no electric power is supplied to any object also includes a state that a small amount of electric power is supplied to the object to the extent that the object cannot operate, in addition to the state that no electric power is supplied to the object.

Figure 1:
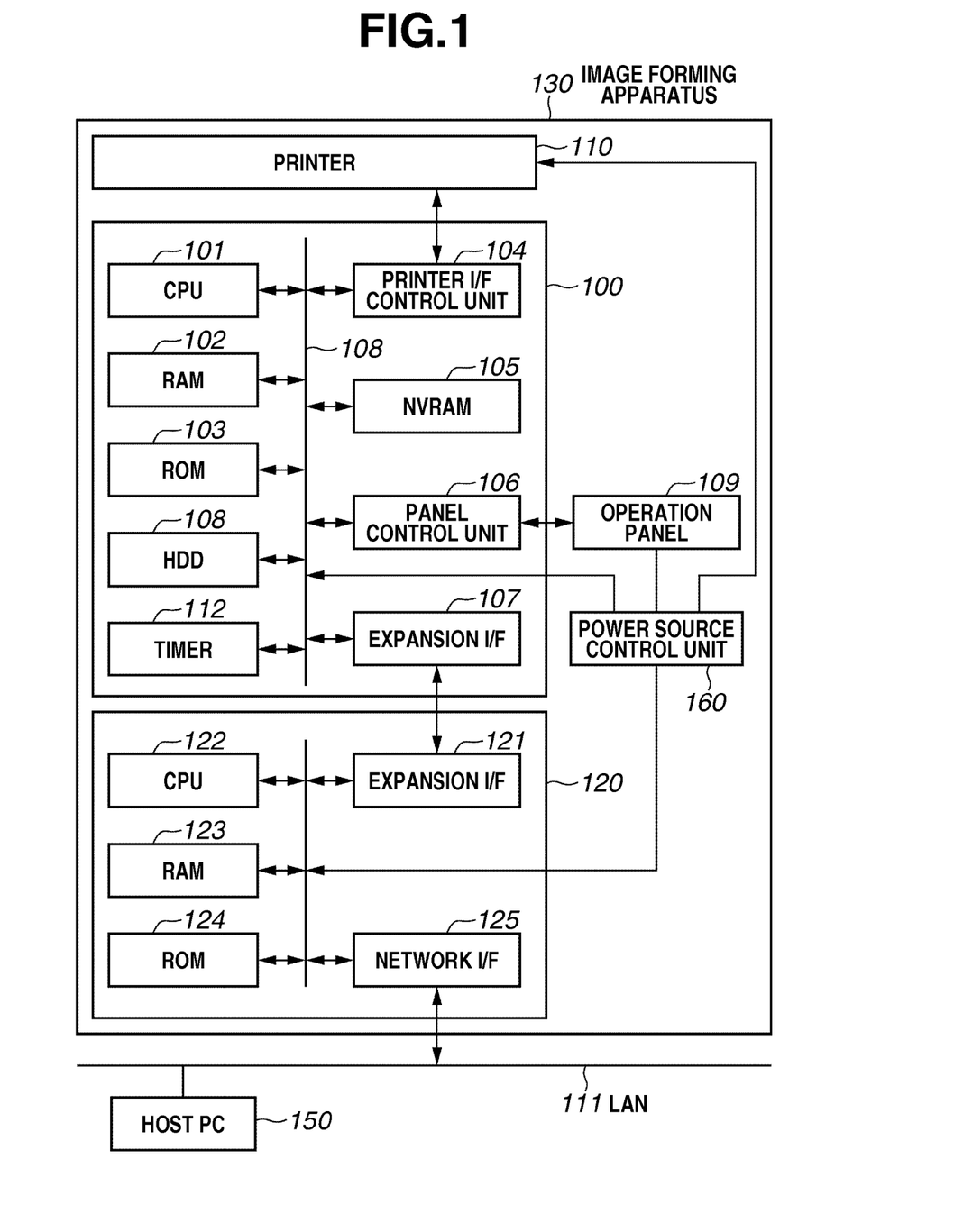
FIG. 1 is a block diagram illustrating an information processing system including a communication control device.

FIG. 1 is a block diagram illustrating an example of the information processing system including a communication control device according to the present exemplary embodiment. FIG. 1 illustrates the example of an image forming apparatus including a Network Interface Card (NIC) unit 120 for connecting the image forming apparatus with a network (LAN) 111. However, the information processing apparatus is not limited to the image forming apparatus as far as the information processing apparatus includes the network interface card.

An image forming apparatus 130 of the present exemplary embodiment executes a power source control. In the power source control, a power source control unit 160 monitors an operating condition or the like of the image forming apparatus 130 in order to shift the image forming apparatus 130 to the sleep mode (i.e., the power saving mode) for automatically saving power consumption of the main body 100. The power supply to the main body 100 is stopped after the image forming apparatus 130 is shifted to the sleep mode, whereas the power supply to the NIC unit 120 is maintained.

In the main body 100 illustrated in FIG. 1, a Central Processing Unit (CPU) 101 executes a software program stored in a Read Only Memory (ROM) 103 or a Hard Disk Drive (HDD) 108 to control the entire image forming apparatus 130. The ROM. 103 stores a boot program, fixed parameters or the like of the image forming apparatus 103. The HDD 108 is a hard disk drive used in storing various types of data such as print data.

A Random Access Memory (RAM) 102 is used for temporarily storing data when the CPU 101 controls the image forming apparatus 103. A timer 112 is configured to manage a time to be lapsed in timer processing. A printer I/F control unit 104 is configured to control the printer 110. The printer 110 includes a printer engine for forming an image onto a print medium and a printer controller for controlling the printer engine.

Non Volatile Random Access Memory (NVRAM) 105 stores various setting values of the image forming apparatus 103. A panel control unit 106 is configured to control an operation panel 109, display various types of information and input instructions from the user.

An expansion I/F unit 107 is configured to control a transmission of data with the LAN 111. A bus 108 is a system bus through which a control signal is transmitted from the CPU 101 and a data signal is transmitted between units. The system bus 108 is connected to the above described CPU 101, the RAM 102, the ROM 103, the HDD 108, a timer 112, the printer I/F control unit 104, the NVRAM 105, the panel control unit 106, and the expansion I/F 107.

In a case where the image forming apparatus 130 is in a state of power saving mode, the power supply to the CPU 101 of the main body 100 is stopped. Accordingly, the power supply to the HDD 108 and the NVRAM 105 is also stopped, and thus functions thereof are unusable. The Network Interface Card (NIC) unit 120 is operated by an Application Specific Integrated Circuit (ASIC) independent from the main body 100.

A network I/F 125 is configured to receive a job from the information processing apparatus, e.g., a client PC, of which main body is energized even in the state of power saving mode and connected through the LAN 111, thereby realizing a proxy response function.

The job corresponds to processing that is requested from the host PC to the image forming apparatus. Examples of the processing include secure printing that the job is executed after executing the below described user identification or rewriting of an address book.

An entity of the job is packet data that is notified from a host PC 150 to the image forming apparatus 130 through the network 111. In the present exemplary embodiment, a control for causing the apparatus to efficiently return from the sleep mode according to a type of the job can be executed such that the CPU 122 of the NIC unit 120 analyzes packet data received from the LAN 111.

The CPU 122 loads a control program stored in the ROM 124 onto the RAM 123 and controls a communication with the host PC 150 and a communication with the main body 100 through the LAN 111. The NIC unit 120 has a configuration that electric power is supplied from the power source control unit 160 even in the state of sleep mode, and thus can establish a communication with the host PC 150.

The ROM 124 is a read only memory for storing a boot program and fixed parameters or the like of the apparatus. The RAM 123 is a random access memory to be used in temporarily storing data. The Network I/F 125 is connected to the external LAN 111 and performs a packet transmission with the host PC 150. The packet transmission includes processing for receiving a job.

A power source control unit 160 is configured to control power supply to each of the units of the main body 100 and the printer 110. The power source control unit 160 is configured in such a manner that power supply to the main body 100 that has shifted to the sleep mode can be controlled according to an instruction from the NIC unit 120. In other words, the power source control unit 160 is configured so that the WOL function can be executed according to the instruction from the NIC unit 120.

In the main body 100, an expansion I/F 107 and an expansion I/F 121 provided at a side of the NIC unit 120 communicate to each other to process the job received from the host PC 150. The NIC unit 120 controls processing of the received packet by determining a packet pattern of the job in a manner as described below while the main body 100 is in a state of the sleep mode.

Figure 2:
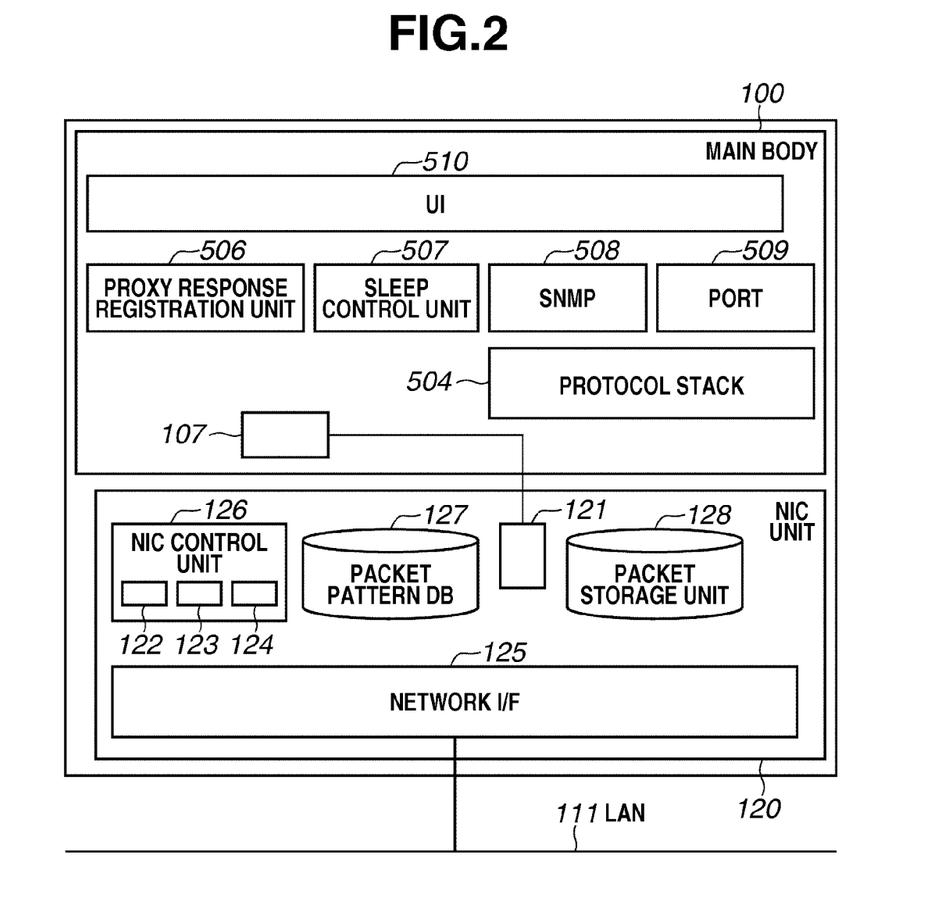
FIG. 2 is a block diagram illustrating a configuration of an image forming apparatus.

Packet patterns are preliminary registered in the NIC unit 120 in order to determine whether the proxy response to the received job can be made or whether the received job can be stored in a packet storage unit 128 (see FIG. 2). The job capable of being stored in the packet storage unit 128 is determined whether or not the job will be stored in the packet storage unit 128 according to a size or a current free space of the packet storage unit 128.

In other words, if an entire job for requesting the below described secure printing can be stored in the packet storage unit 128, the job is stored therein while a state of power saving mode of the main body 100 is maintained. Then, after the main body 100 is woken up on LAN from the power saving mode, the NIC control unit 126 (see FIG. 2) executes job processing that the job stored in the packet storage unit 128 is transmitted to the main body 100.

More specifically, the CPU 122 controls processing of the packet in a case where the job received from the LAN 111 matches one of the registered packet patterns which can be proxy responded to the job or in a case other than the above, while the main body 100 is in the state of sleep mode, according to steps of the below described flow chart.

FIG. 2 is a block diagram illustrating configurations of hardware and software of the image forming apparatus 130 illustrated in FIG. 1. The image forming apparatus 130 mainly includes the main body 100 and the NIC unit 120.

The NIC unit 120 includes a Network I/F 125 for transmitting a network packet between the NIC unit 120 and an external LAN, and an NIC control unit 126 for activating the NIC unit 120 or transferring data between the NIC unit 120 and the main body 100.

The NIC unit 120 further includes a packet pattern database (DB) 127 for registering packet patterns for proxy responding, instead of the main body 100, to the packet received from the LAN 111. The NIC control unit 126 includes the CPU 122, the RAM 123, and the ROM 124 as illustrated in FIG. 1.

The main body 100 includes an SNMP module unit 508, which transmits the SNMP between the main body 100 and the external device (including the host PC 150) through a Network Protocol Stack 504. The main body 100 includes a Port module unit 509 for printing.

The main body 100 includes a sleep control unit 507, which causes the main body 100 to shift to the state of power saving mode, and administers a control of power saving for causing the main body 100 to be returned from the state of power saving mode. The main body 100 further includes a proxy response registration unit 506 that registers the proxy response packet patterns in the NIC unit 120.

The main body 100 further includes a user interface unit (UI) 510 so that the user can make a setting about functions. The main body 100 still further includes a function to store the packet received from the packet storage unit 128. Proxy response processing executed by the image forming apparatus having the above described configuration, during the power saving mode, is described below.

In order to realize the power saving mode, such a specification is typical that, for example, the power supply to the CPU 101 of the main body 100 is stopped and a part of the hardware module is operated during the power saving mode.

In order to realize the proxy response function by the NIC unit 120, the present image forming apparatus 130 includes the expansion I/F 107 and the expansion I/F 121 of the NIC unit 120. The NIC unit 120 includes the CPU 122, as is illustrated in FIG. 1, so that the job can be received through the network 111 without stopping the functions of the main body 100 and the printer 110 even in a state that the main body 100 and the printer 110 are stopped according to the power saving mode.

The proxy response function causes the NIC unit 120 or the other servers to transmit a proxy response. In this proxy response, in a case where a packet is transmitted from the external host PC 150 to the main body 100 while the main body 100 is in the state of power saving mode, if the packet matches one of the preliminary registered packet patterns, the corresponding response packet is transmitted as the proxy response.

The NIC unit 120 of the image forming apparatus 130 is configured to be capable of registering proxy response objective packet patterns and the corresponding number of packet patterns to be transmitted as the proxy response corresponding to the proxy response objective packet patterns in the Network I/F 125 before the main body is shifted to the power saving mode.

Typical proxy response processing in the image forming apparatus 130 illustrated in FIG. 1 is described below with reference to FIG. 3.

Figure 3:
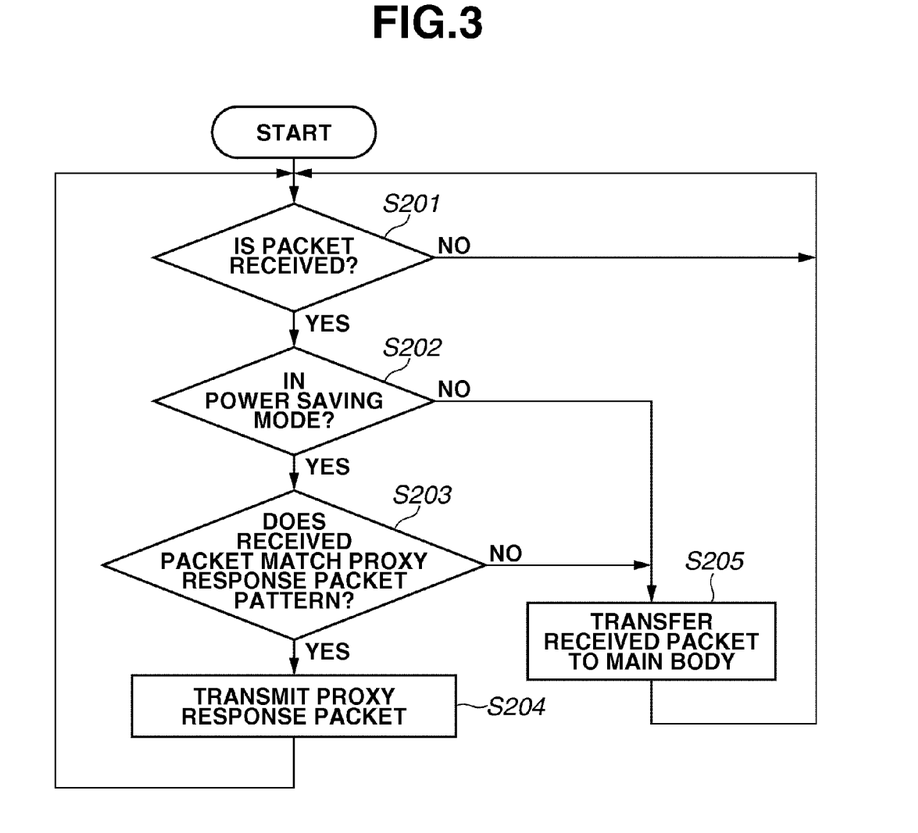
FIG. 3 is a flow chart illustrating steps of proxy response processing of the image forming apparatus.

FIG. 3 is a flow chart illustrating steps of the typical proxy response processing in the image forming apparatus 130 illustrated in FIG. 1. Each of steps S201 through S204 can be realized in such a manner that the CPU 122 of the NIC unit 120 loads the control program stored in the ROM 124 onto the RAM 123 and executes the program on the RAM 123.

In step S201, in a case where the CPU 122 receives a packet from the host PC 150 connected to the LAN 111 through the Network I/F 125 (YES in step S201), the processing proceeds to step S202. In step S202, the CPU 122 determines whether or not the main body 100 is in the state of power saving mode. The CPU 122 is configured in such a manner that the CPU 122 can determine whether or not a side of the main body 100 is in the state of power saving mode by determining a mode signal obtainable from the expansion I/F 107 (e.g., a mode signal allotted to a specific bit of the I/F).

In step S202, in a case where the CPU 122 determines that the main body 100 is in the state of normal mode (NO in step S202), the processing proceeds to step S205. In step S205, the packet received from the network is transferred to the main body 100, as it is, through the expansion I/F 121. On the other hand, in step S202, in a case where the CPU 122 determines that the main body 100 is in the state of power saving mode (YES in step S202), the processing proceeds to step S203. In step S203, the CPU 122 determines whether or not the packet received from the network matches any one of the proxy response objective packet patterns that are registered in the Network I/F 125.

In step S203, in a case where the CPU 122 determines that the received packet pattern does not match any one of the proxy response objective packet patterns (NO in step S203), the processing proceeds to step S205. In step S205, the received packet is transferred to the main body 100, as it is, through the expansion I/F 121, thereby activating the main body 100.

Each of the packet pattern and the packet itself, which is capable of returning the main body 100 from the power saving mode to a standby mode, is referred to as a Wake On LAN packet (a WOL packet). Also, returning of the main body 100 from the power saving mode to the standby mode upon receiving the WOL packet is referred to as a Wake On LAN (WOL).

On the other hand, in step S203, in a case where the CPU 122 determines that the received packet pattern matches one of the proxy response objective packet patterns (YES in step S5203), the processing proceeds to step S204. In step S204, the proxy response packet pattern corresponding to the received packet is transmitted to the LAN 111 and the processing returns to step S201.

As described above, in a case where the NIC unit 120 receives a specific packet while the main body 100 of the image forming apparatus 130 is in the state of power saving mode, the packet can be processed without activating the main body 100. Accordingly, a power saving effect of the whole image forming apparatus 130 can be enhanced.

Figure 4:
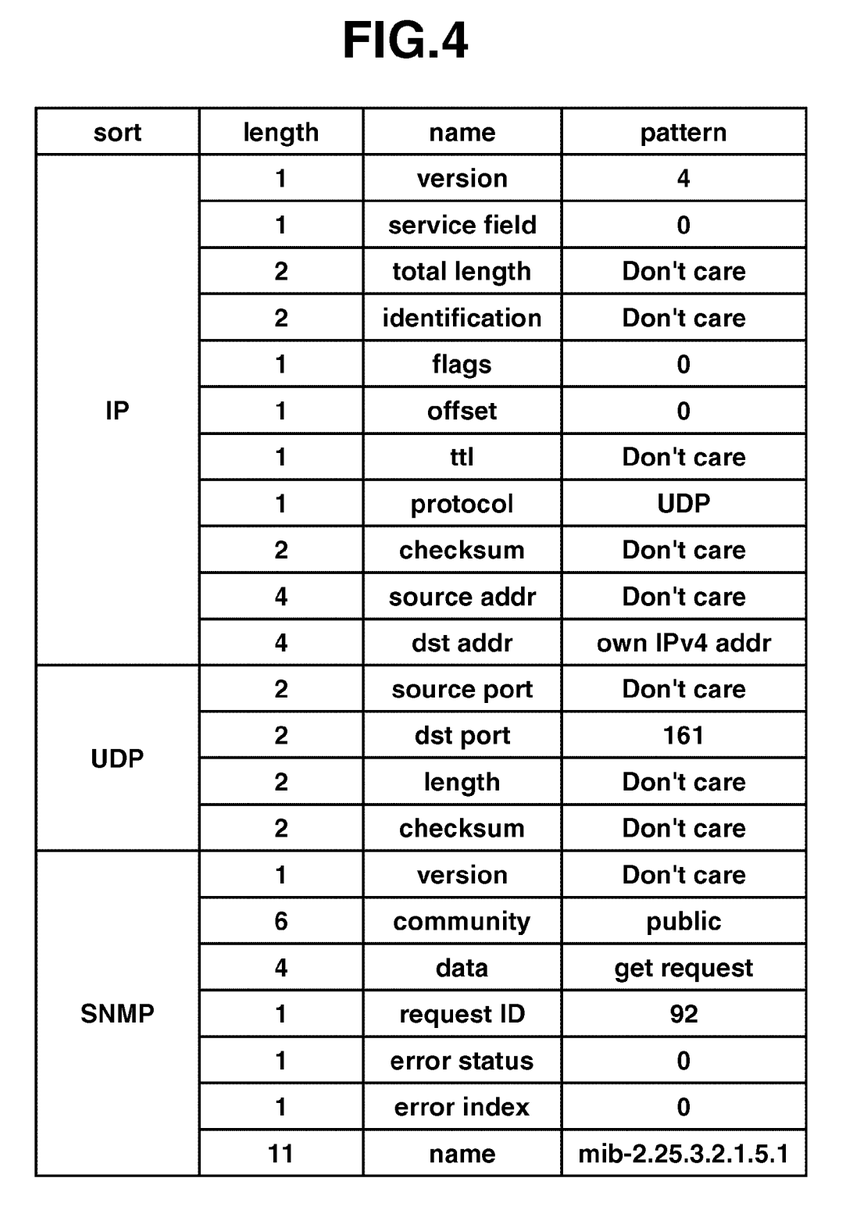
FIG. 4 is a table illustrating a packet pattern for a proxy response.

For example, as is illustrated in FIG. 4, an SNMP request is registered in the Network I/F 125 as a packet pattern for the proxy response. Further, a packet pattern of an SNMP replay is registered in the Network I/F 125 as a response packet pattern with respect to an SNMP request packet illustrated in FIG. 4.

Figure 5:
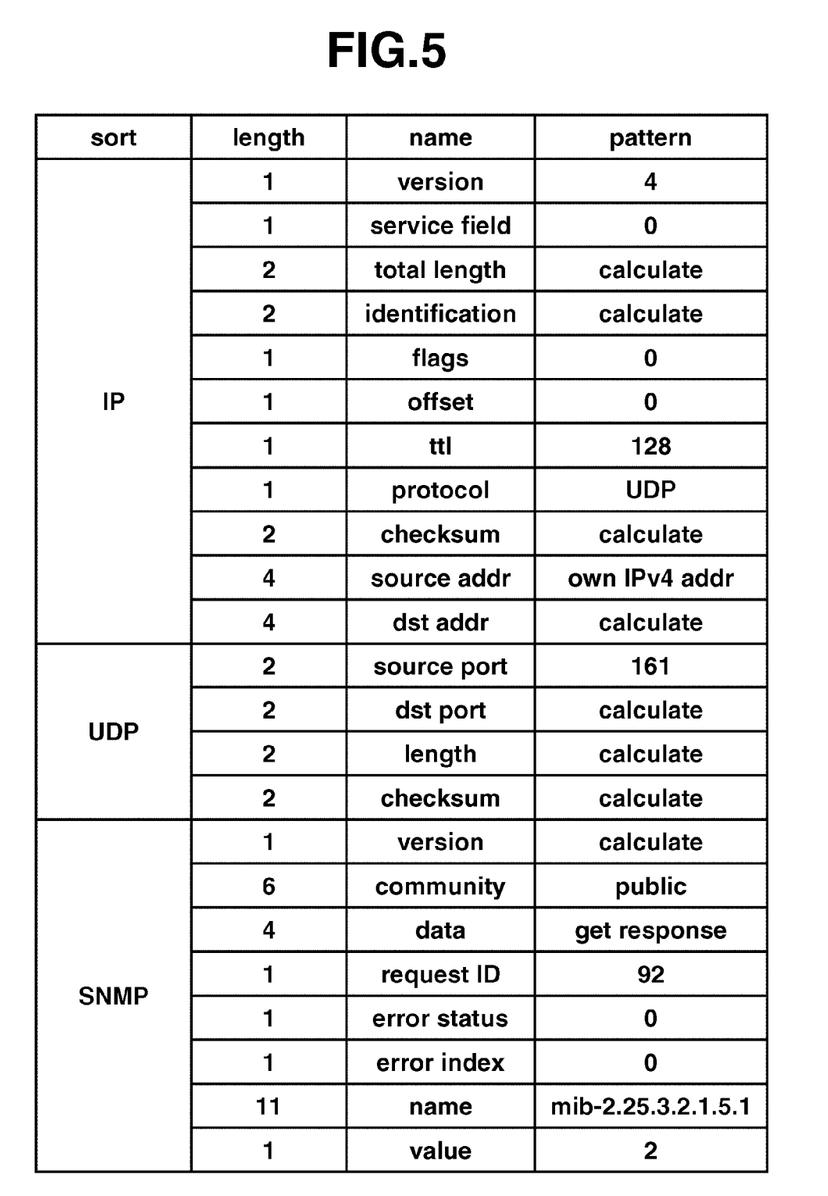
FIG. 5 is a table illustrating a packet pattern of a Simple Network Management Protocol (SNMP) reply.

In a case where the Network I/F 125 of the NIC unit 120 receives a packet of the SNMP request from the LAN 111 during the power saving mode, the packet of the SNMP request matches one of the registered packet patterns. In this case, the NIC unit 120 does not activate the main body 100. Instead thereof, the registered SNMP replay packet is responded by the Network I/F 125.

In a case where the Network I/F 125 of the NIC unit 120 receives a packet, e.g., a packet of a Line Printer Daemon (LPD) protocol or an Internet Control Message Protocol (ICMP), other than the SNMP request during the power saving mode, the main body 100 is activated since the packet does not match any one of the packet patterns.

Figure 6:
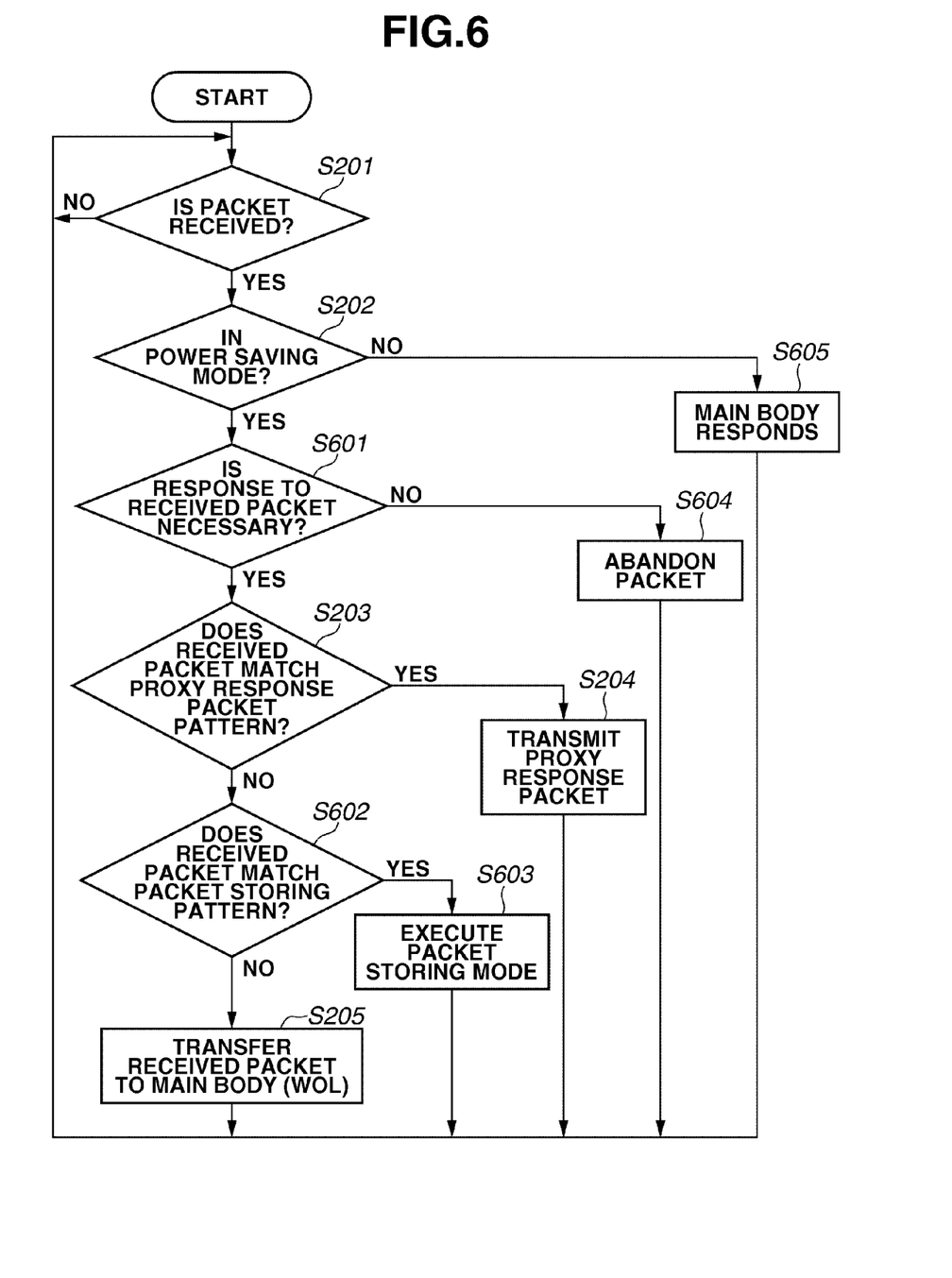
FIG. 6 is a flow chart illustrating steps of packet processing of the information processing apparatus.

FIG. 6 is a flow chart illustrating an example of steps of packet processing in the information processing apparatus of the present exemplary embodiment. FIG. 6 illustrates the example of the response processing with respect to a packet reception by the NIC unit 120. Each of the steps S201 through S205 and S601 through S605 can be realized in such a manner that the CPU 122 of the NIC unit 120 loads the control program stored in the ROM 124 onto the RAM 123 and executes the program on the RAM 123. The steps identical to those in FIG. 3 are provided with the same step numbers.

In step S201, when the Network I/F 125 of the NIC unit 120 receives a packet from the LAN 111 (YES in step S201), the processing proceeds to step S202. In step S202, in a case where the CPU 122 determines that the main body 100 is in the state of power saving mode (YES in step S202), the processing proceeds to step S601. In step S601, the CPU 122 of the NIC control unit 126 determines whether or not a response to the packet received from the LAN 111 is necessary. Determination processing as to determining necessity of response is exemplified in FIG. 7.

On the other hand, in step S202, in a case where the CPU 122 determines that the main body 100 is not in the state of power saving mode (NO in step S202), the processing proceeds to step S605. In step S605, the NIC unit 120 transmits the received packet to the main body 100 and causes the CPU 101 of the main body 100 to respond to the packet. Then, the processing returns to step S201.

In step S601, in a case where the CPU 122 determines that a response to the packet received from the LAN 111 is not necessary (NO in step S601), the processing proceeds to step S604. In step S604, the CPU 122 abandons the packet received from the LAN 111 and the processing returns to step S201.

On the other hand, in step S601, in a case where the CPU 122 determines that a response is necessary (YES in step 5601), the processing proceeds to step S203. In step S203, the CPU 122 of the NIC control unit 126 determines whether or not the packet received from the LAN 111 matches any one of the proxy response packet patterns. In step S203, in a case where the CPU 122 determines that the packet received from the LAN 111 matches one of the proxy response packet patterns (YES in step S203), the processing proceeds to step S204. In step S204, the CPU 122 of the NIC unit 120 reads out the proxy response pattern from the packet pattern database (DB) 127 to transmit the proxy response pattern onto the LAN 111. Then, the processing returns to step S201.

On the other hand, in step S203, in a case where the CPU 122 determines that the received packet pattern does not match any one of the proxy response packet patterns (NO in step S203), the processing proceeds to step S602.

In step S602, the CPU 122 of the NIC control unit 126 determines whether or not the packet received from the LAN 111 matches any one of the packet stored patterns registered in the packet pattern DB 127. In step S602, in a case where the CPU 122 determines that the received packet pattern matches one of the packet stored patterns (YES in step S602), the processing proceeds to step S603. In step S603, the CPU 122 executes a below described packet storing mode, and the processing returns to step S201.

On the other hand, in step S602, in a case where the CPU 122 determines that the received packet pattern does not match any one of the packet stored patterns (NO in step S602), the processing proceeds to step S205. In step S205, the received packet is transmitted to the main body 100 through the expansion I/F 121. The NIC unit 120 wakes up the main body 100 on LAN, i.e., causes the main body 100 to be returned from the power saving mode to the standby mode. Then, the processing returns to step S201.

Figure 7:
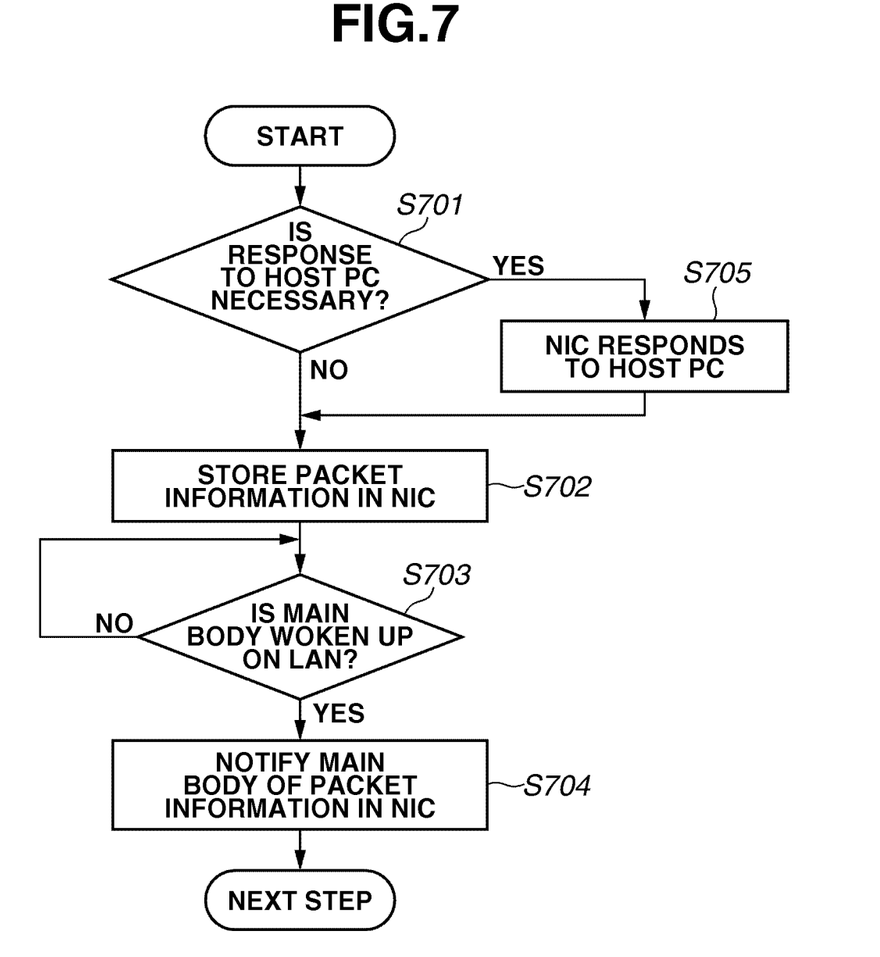
FIG. 7 is another flow chart illustrating steps of packet processing of the information processing apparatus.

FIG. 7 is a flow chart illustrating an example of steps of packet processing in the information processing apparatus of the present exemplary embodiment. FIG. 7 illustrates the example of processing in a packet storing mode in step S603. Each of the steps is realized such that the CPU 122 of the NIC unit 120 loads the control program stored in the ROM 124 onto the RAM 123 and executes the program on the RAM 123. Steps identical to steps of FIG. 3 are provided with the same step numbers.

In step S701, in a case where the CPU 122 executes the packet storing mode in step S603, the CPU 122 of the NIC control unit 126 determines whether or not a response to the host PC 150 from which the packet is transmitted is necessary. In step S701, in a case where the CPU 122 determines that a response to the host PC 150 is necessary (YES in step S701), the processing proceeds to step S705. In step S705, the CPU 122 of the NIC unit 120 responds to the host PC 150 which is connected to the LAN 111 and the processing proceeds to step S702.

On the other hand, in step S701, in a case where the CPU 122 determines that no response to the host PC is necessary (NO in step S701), the processing proceeds to step S702. In step S702, the CPU 122 causes the packet storage unit 128 of the NIC unit 120 to store packet data from the LAN 111. The packet storage unit 128 is configured to be secured on the RAM 123 illustrated in FIG. 1. However, the packet storage unit 128 may be configured to include another memory.

In step S703, the CPU 122 determines whether or not the main body 100 is shifted to a state of WOL according to a factor other than the above described proxy response processing. In step S703, in a case where the CPU 122 determines that the main body 100 is shifted to the state of WOL according to the factor other than the above described proxy response processing (YES in step S703), the processing proceeds to step S704. In step S704, the CPU 122 notifies the packet data stored in the packet storage unit 128 to the main body 100 through the expansion I/Fs 121 and 107. Then, the processing is ended. The CPU 122 executes processing to delete the packet data stored in the packet storage unit 128 after the notification, and becomes ready state for the subsequent packet storage processing.

In the present exemplary embodiment, as a "packet storing pattern" registered in the packet pattern DB 127, a command such as "rewriting an address book or various setting values that the image forming apparatus uses in the data transmission processing" is exemplified.

In a case where the command is received by the NIC unit 120 during the power saving mode, the CPU 122 stores data of the address book and the various setting values in the packet storage unit 128 in the NIC unit 120. The CPU 101 of the main body 100, when the main body 100 is woken up on LAN (i.e., upon WOL), executes the processing to rewrite data of the address book or the various setting values stored in the HDD 108 or NRAM 105 based on the data notified from the NIC unit 120.

According to the present exemplary embodiment, even when the main body 100 receives a job to be processed, the state of power saving mode of the main body 100 can be kept, and thus the power saving effect of the entire system can be improved.

In the above described exemplary embodiment, it is determined whether or not a proxy response to the received packet pattern can be made, and thus received packet is stored. However, the present exemplary embodiment may have such configuration that, in a case where the RAM 123 of the NIC unit 120 has a satisfactory capacity to receive and store a job, a specific job, e.g., a job which is not necessary to be output immediately after it is received, is once stored and is notified to the main body 100 when the main body 100 is subsequently woken up on LAN (i.e., upon WOL).

In a case where, for example, there is no memory limitation in the packet storage unit 128 which is secured in the NIC unit 120, the NIC unit 120 can be applied to "secure printing (printing is performed when the user enters a password by using an operation unit of a device after a job is input from a PC)".

In this case, the CPU 122 of the NIC unit 120 stores all the pieces of image data in the packet storage unit 128. In a case where the CPU 122 of the NIC unit 120 accepts a print request of the user from the UI 510, the CPU 122 notifies the packet data stored in the packet storage unit 128 to the main body 100. Alternatively, in a case where the main body 100 is woken up on LAN (i.e., WOL) according to the other factors, the CPU 122 of the NIC unit 120 notifies the packet data stored in the packet storage unit 128 to the main body 100.

Figure 8:
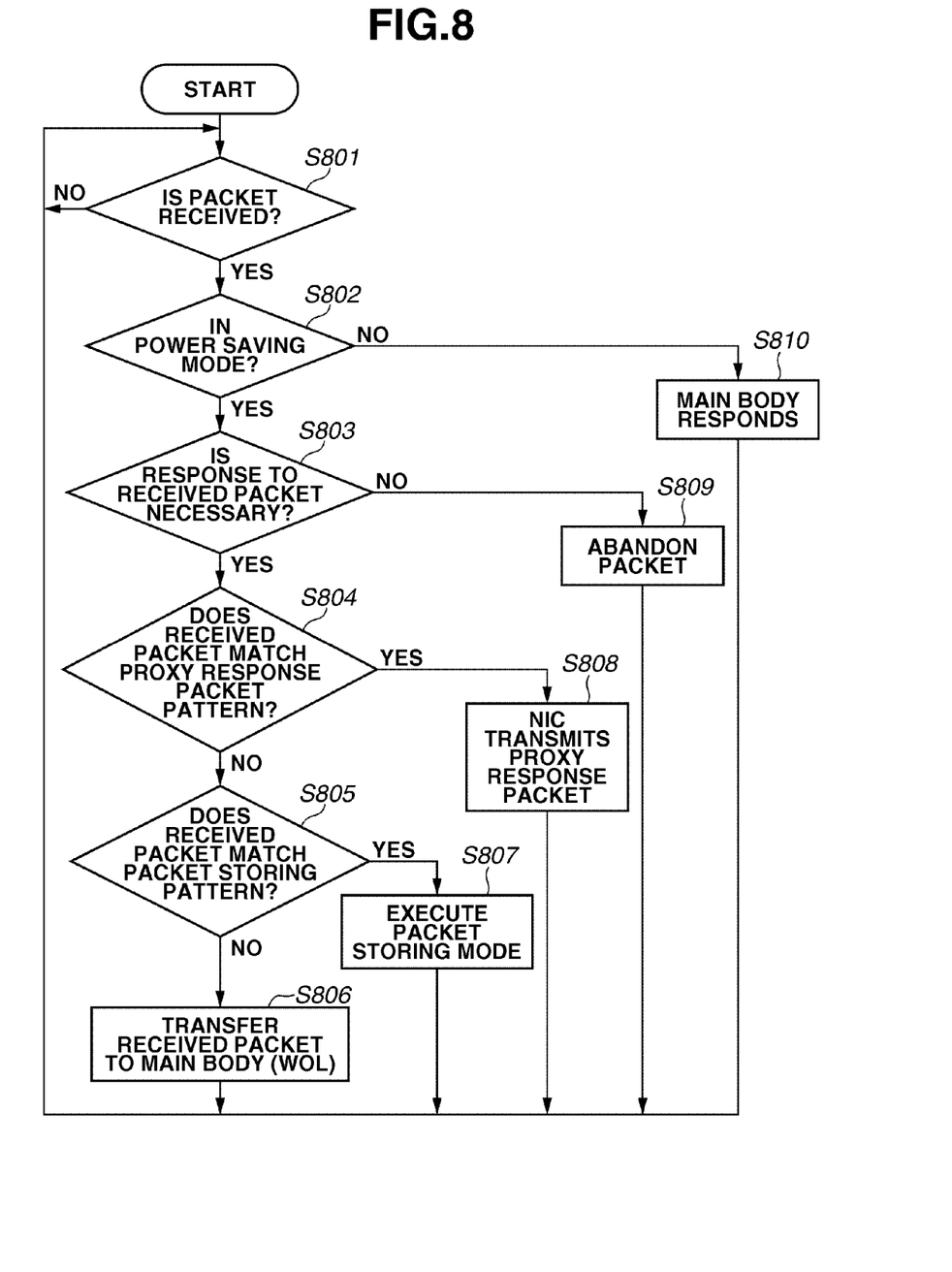
FIG. 8 is a flow chart illustrating steps of job processing of the information processing apparatus.

FIG. 8 is a flow chart illustrating an example of steps of job processing in the information processing apparatus of the present exemplary embodiment. FIG. 8 illustrates the example of response processing with respect to a packet reception by the NIC unit 120. Each of the steps is realized in such a manner that the CPU 122 of the NIC unit 120 loads a control program stored in the ROM 124 onto the RAM 123 to execute the program on the RAM 123.

In step S801, in a case where the Network I/F 125 of the NIC unit 120 receives a job (i.e., a packet) from the LAN 111 (YES in step S801), the processing proceeds to step S802. In step S802, the CPU 122 of the NIC unit 120 determines whether or not the main body 100 is in the state of power saving mode.

In step S802, in a case where the CPU 122 determines that the main body 100 is not in the state of power saving mode (NO in step S802), the processing proceeds to step S810. In step S810, the CPU 122 transfers the job (i.e., the packet) received from the LAN 111 to the main body 100 and the processing returns to step S801.

On the other hand, in step S802, in a case where the CPU 122 of the NIC unit 120 determines that the main body 100 is in the state of power saving mode (YES in step S802), the processing proceeds to step S803. In step S803, the CPU 122 determines whether or not a response to the packet received from the LAN 111 is necessary. In step S803, in a case where the CPU 122 determines that the response to the packet is not necessary (NO in step S803), the processing proceeds to step S809. In step S809, the CPU 122 abandons the received packet, and the processing returns to step S801.

On the other hand, in step S803, in a case where the CPU 122 determines that the response to the job is necessary (YES in step S803), the processing proceeds to step S804. In step S804, the CPU 122 determines whether or not the received packet matches one of the proxy response packet patterns.

In step S804, the CPU checks a pattern of the received packet with the preliminary registered patterns of packets to thereby determine whether or not the pattern of the received packet matches one of the proxy response packet patterns. In step S804, in a case where the CUP 122 determines that the received packet matches one of the proxy response packet patterns (YES in step S804), the processing proceeds to step S808. In step S808, the CPU 122 transmits the proxy response packet to the LAN 111, and the proceeding returns to step S801.

On the other hand, in step S804, in a case where the CPU 122 determines that the received packet does not match any one of the proxy response packet patterns (NO in step S804), the processing proceeds to step S805. In step S805, the CPU 122 determines whether or not the received packet matches one of the packet stored patterns stored in the packet pattern data base (packet pattern DB) 127. In step S805, in a case where the CPU 122 determines that the received packet matches one of the packet stored patterns (YES in step S805), the proceeding proceeds to step S807, whereas in cases other than the above, the processing proceeds to step S806.

In step S807, the CPU 122 executes the packet storing mode illustrated in FIG. 7, and the proceeding returns to step S801. In step S806, the CPU 122 notifies to the main body 100 an instruction to wake up the main body 100 on LAN from the power saving mode (i.e., WOL), and the processing returns to step S801.

Accordingly, as to the packet that matches one of the packet stored patterns, the CPU 122 of the NIC unit 120 stores the job (i.e., the packet) in the RAM 123. In this state, in a case where the CPU 122 accepts a print request from the user who logged in from the UI 510, in step S807, the CPU 122 can transfer the job (i.e., the packet) stored in the packet storage unit 128 to the main body 100.

According to the present exemplary embodiment, in a case where the packet pattern of the job that the NIC unit 120 received from the host PC 150 through the LAN 111 is the one to be stored, it is not necessary to wake up the main body 100 on the LAN from the power saving mode if the main body 100 is in the state of power saving mode. The CPU 122 stores the job received from the host PC 150, thereby completing the response processing to the host PC 150.

A network packet when the host PC 150 on the LAN 111 sets information to the image forming apparatus is described below. In the present exemplary embodiment, the host PC 150 sets information to the image forming apparatus by using the Simple Network Management Protocol (SNMP). The SNMP is a mere example in the present exemplary embodiment, and thus the protocol used in the present invention is not limited to the SNMP.

Figure 9:
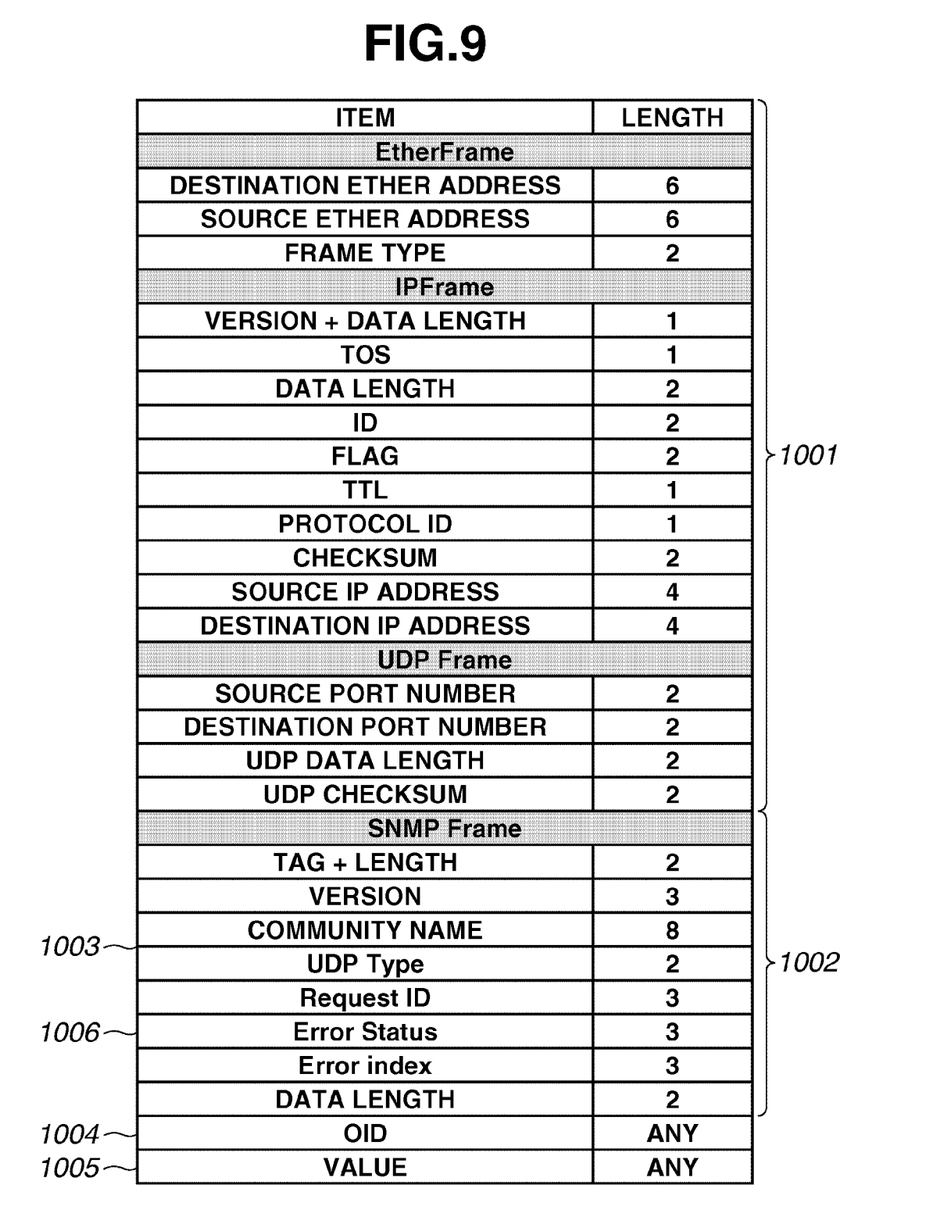
FIG. 9 is a table illustrating a configuration of an SNMP protocol.

FIG. 9 illustrates a configuration of an SNMP protocol, which is used in a communication between the host PC 150 and the image forming apparatus 130 illustrated in FIG. 1. FIG. 9 illustrates the example of the configuration of the SNMP protocol when the host PC 150 sets predetermined information with respect to the main body 100 of the image forming apparatus 130.

In FIG. 9, information 1001 is positioned in a hierarchy of the SNMP protocol. More specifically, the SNMP protocol includes an Ethernet (trademark) II, an Internet Protocol (IP) and a User Datagram Protocol (UDP), which are hierarchically stacked, and a data configuration of the SNMP protocol complies with specifications of those protocols.

A data configuration of SNMP protocol data 1002 complies with the specification of the SNMP protocol. The SNMP protocol data 1002 includes a Protocol Data Unit Type (PDU Type) 1003 of the SNMP. Since the present packet is a packet that the host PC 150 sets information to the main body 100 of the image forming apparatus 130, a value of the present packet includes a value indicative of SetRequest.

An object ID 1004 is included in the SNMP object data. A value uniquely indicating information of a Management Information Base (MIB) transmitted according to the SNMP is inserted in the object ID 1004. The host PC 150 inserts the object ID 1004 of the MIB corresponding to the information to be desired to be set to the image forming apparatus 130 into this field. A value 1005 indicates a value of the MIB. The host PC 150 inserts a value of information, which is desired to be set to the image forming apparatus 130, into this field.

In a case where the CPU 122 of the NIC unit 120 receives the SNMP packet having the configuration illustrated in FIG. 9 from the host PC 150 through the LAN 111, the CPU 122 of the NIC unit 120 analyzes the packet, and extracts a type and a value of the information to be set. The type of information is to be related to the object ID 1004, and the value of the information is to be related to the value 1005 of the MIB, respectively.

The CPU 122 of the NIC unit 120 temporality stores these pieces of information in a memory in the NIC unit 120.

Then, the CPU 122 of the NIC unit 120 responds to the host PC 150 according to the SNMP protocol. The responding packet has the configuration of the SNMP as illustrated in FIG. 9. An error information field 1006 of the SNMP includes a NoError indicating that the information is successfully set.

In other words, in a case where the CPU 122 of the NIC unit 120 receives a set request of the SNMP from the host PC 150, in step S705 of FIG. 7, the CPU 122 of the NIC unit 120 immediately responds to the host PC 150 according to the SNMP.

In step S704, the CPU 122 of the NIC unit 120 notifies to the main body 100 the information stored in the memory at a timing the main body 100 returns from the sleep mode. Then, the CPU 122 of the NIC unit 120 sets the information to the database of the MIB of the CPU 101 of the main body 100 (e.g., stored in the NVRAM 105).

According to the present exemplary embodiment, if the packet storage unit 128 has a capacity capable of storing a whole job for requesting the secure printing, the packet storage unit 128 can store the job without waking up the main body 100 on LAN from the power saving mode. Therefore, even when the main body 100 receives the job to be processed, the main body 100 can keep the state of power saving mode. Thus, the power saving effect as the whole system is improved.

Figure 10:
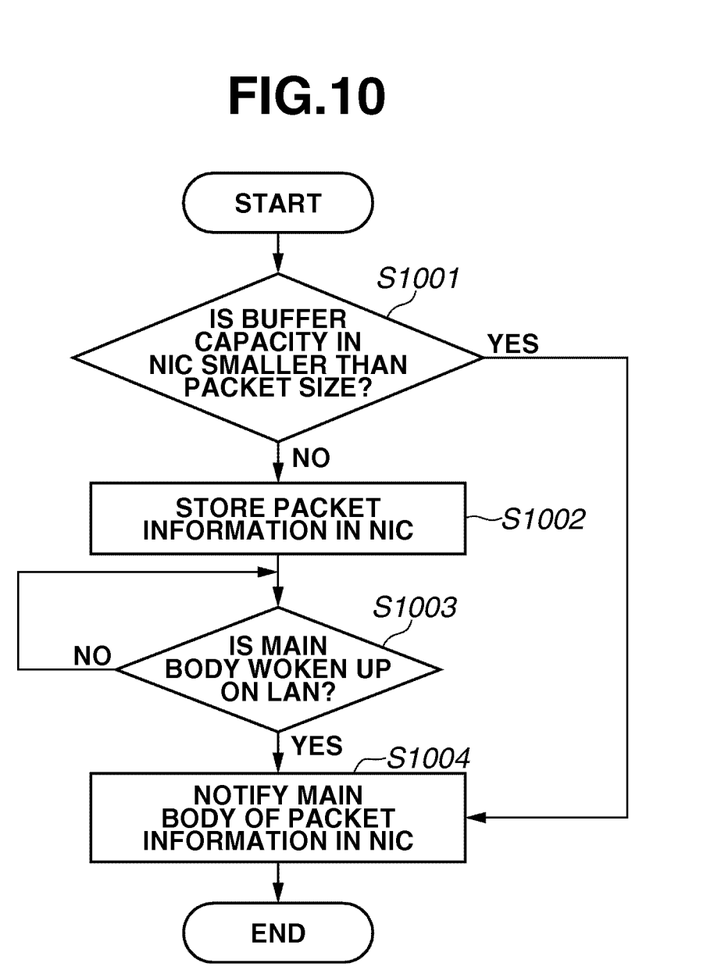
FIG. 10 is another flow chart illustrating steps of the job processing of the information processing apparatus.

FIG. 10 is a flow chart illustrating an example of steps of job processing in the information processing apparatus 130 of the present exemplary embodiment. FIG. 10 illustrates the example of the processing performed by the NIC unit 120 with respect to the packet storing mode. Each of the steps is realized in such a manner that the CPU 122 of the NIC unit 120 loads the control program stored in the ROM 124 onto the RAM 123 and executes the control program on the RAM 123.

In step S1001, the CPU 122 of the NIC control unit 126 determines whether or not a buffer capacity secured in order to store the packet during the sleep mode of the main body 100 is smaller than a packet size of the received packet. In step S1001, in a case where the CPU 122 determines that the secured buffer capacity is smaller than the packet size of the received packet (YES in step S1001), the processing proceeds to step S1004.

In step S1001, in a case where the CPU 122 determines that the buffer capacity is larger than the packet size of the received packet (NO in step S1001), the processing proceeds to step S1002. In step S1002, similar to the first exemplary embodiment, the CPU 122 stores the packet in the NIC unit 120. Subsequently, the CPU 122 executes steps S1003 and S1004. Then, the present processing is ended. The steps S1003 and S1004 are identical to the steps S703 and S704 of FIG. 7, respectively.

Accordingly, in a case where the buffer capacity is smaller than the packet size of the received packet, the packet cannot be stored in the NIC unit 120. Therefore, the CPU 122 wakes up the main body 100 on LAN (i.e., WOL), and notifies (transmits) the received packet information to the main body 100.

Figure 11:
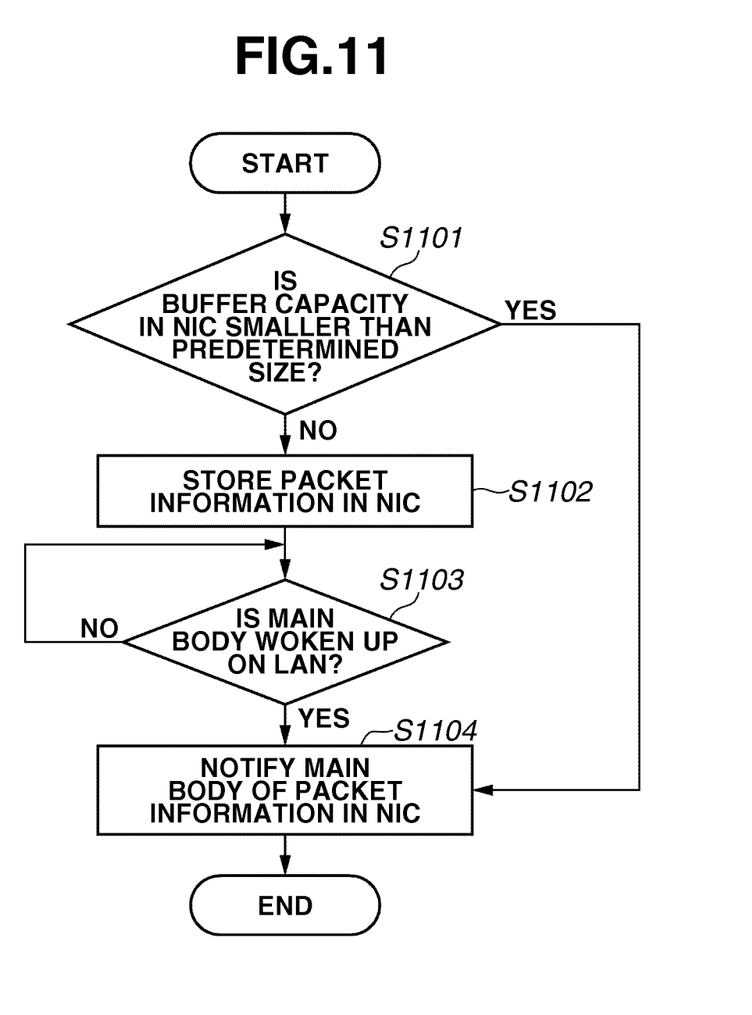
FIG. 11 is further another flow chart illustrating steps of the job processing of the information processing apparatus.

FIG. 11 is a flow chart illustrating an example of steps of job processing in the information processing apparatus 130 of the present exemplary embodiment. FIG. 11 is the example of the processing performed by the NIC unit 120 with respect to the packet storing mode. Each of the steps is realized in such a manner that the CPU 122 of the NIC unit 120 loads the control program stored in the ROM 124 onto the RAM 123 and executes the control program on the RAM 123.

In step S1101, the CPU 122 of the NIC control unit 126 compares the buffer capacity for storing the packet to be stored in the NIC unit with a predetermined size, and determines whether or not the buffer capacity is smaller than the predetermined size.

In step S1101, in a case where the CPU 122 determines that the buffer capacity is larger than the predetermined size (NO in step S1101), the processing proceeds to step S1102. In step S1102, similar to the first exemplary embodiment, the CPU 122 stores the packet received from the host PC 150 through the LAN 111 in the NIC unit 120. Then, the CPU 122 executes the steps S1103 and S1104, and the present processing is ended. Steps S1103 and S1104 are identical to steps S703 and S704 illustrated in FIG. 7, respectively.

On the other hand, in step S1101, in a case where the CPU 122 determines that the buffer capacity is smaller than the predetermined size (YES in step S1101), the processing proceeds to step S1104. In step S1104, the CPU 122 notifies the packet information, having been received from the host PC 150 through the LAN 111 to be stored, to the main body 100 and the present processing is ended.

The predetermined size set in step S1101 can be set to any value. For example, the predetermined size may be "a size corresponding to the sum of two packet sizes". With the above described configuration, even when the CPU 122 receives the next packet immediately after receiving the packet to be stored in the NIC unit 120, the CPU 122 can receive the next packet without causing buffer overflow.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-221338 filed Sep. 25, 2009, which is hereby incorporated by reference herein in its entirety.

What is claimed is:

1. An information processing apparatus configured to operate in a first power mode in which electric power is supplied to a processing unit or in a second power mode in which electric power is not supplied to the processing unit; the information processing apparatus comprising:
  an input unit configured to input data;
  a control unit configured to control a power mode of the information processing apparatus so that, (a) in a case where the data input by the input unit does not match a specific pattern while the information processing apparatus is operated in the second power mode, the power mode of the information processing apparatus is shifted from the second power mode to the first power mode, and (b) in a case where the data input by the input unit matches the specific pattern while the information processing apparatus is operated in the second power mode, the power mode of the information processing apparatus remains in the second power mode and the input data is stored in a storage unit, and
  a transmitting unit configured to transmit the input data stored in the storage unit to the processing unit in a case where the information processing apparatus shifts into the first power mode from the second power mode in a state that the storage unit stores second type data.

2. The information processing apparatus according to claim 1, wherein the input data which does not match the specific pattern is data to be immediately processed by the processing unit, and the input data which matches the specific pattern is data not to be immediately processed by the processing unit.

3. The information processing apparatus according to claim 1, wherein in a case where the data input by the input unit does not match the specific pattern, the processing unit processes the data input by the input unit after the power mode of the information processing apparatus is shifted from the second power mode to the first power mode.

4. The information processing apparatus according to claim 1, wherein the control unit performs control so that, (c) in a case where the data input by the input unit matches a pattern different from the specific pattern while the information processing apparatus is operated in the second mode,
  the power mode of the information processing apparatus remains in the second power mode, and
  the input data is processed in a state that the power mode of the information processing apparatus remains in the second power mode.

5. The information processing apparatus according to claim 1, wherein the electric power is supplied to the input unit, the control unit and the transmitting unit.

6. A control method for controlling an information processing apparatus configured to operate in a first power mode in which electric power is supplied to a processing unit or in a second power mode in which electric power is not supplied to the processing unit, the control method comprising:
  inputting data;
  controlling a power mode of the information processing apparatus so that, (a) in a case where the data input by the inputting step does not match a specific pattern while the information processing apparatus is operated in the second power mode, the power mode of the information processing apparatus is shifted from the second power mode to the first power mode, and (b) in a case where the data input by the input unit matches the specific pattern while the information processing apparatus is operated in the second power mode, the power mode of the information processing apparatus remains in the second power mode and the input data is stored in a storage unit, and
  transmitting the input data stored in the storage unit to the processing unit in a case where the information processing apparatus shifts into the first power mode from the second power mode in a state that the storage unit stores second type data.

7. A non-transitory computer-readable storage medium storing computer-executable instructions for implementing the control method of claim 6.

* * * * *